(12) United States Patent
Wen (10) Patent No.: US 11,703,632 B2
(45) Date of Patent: Jul. 18, 2023

(54) DISPLAY DEVICE AND LIGHT GUIDE PLATE

(71) Applicant: E Ink Holdings Inc., Hsinchu (TW)

(72) Inventor: Yu-Chuan Wen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 26 days.

(21) Appl. No.: 17/446,168

(22) Filed: Aug. 27, 2021

(65) Prior Publication Data

US 2022/0099882 A1 Mar. 31, 2022

(30) Foreign Application Priority Data

Sep. 30, 2020 (TW) ................................ 109133997

(51) Int. Cl.
*G02B 6/00* (2006.01)
*F21V 8/00* (2006.01)
*G09F 9/30* (2006.01)

(52) U.S. Cl.
CPC ......... *G02B 6/0081* (2013.01); *G02B 6/0055* (2013.01); *G09F 9/301* (2013.01)

(58) Field of Classification Search
CPC .. G02B 6/0081; G02B 6/0055; G02B 6/0036; G09F 9/301
See application file for complete search history.

(56) References Cited

U.S. PATENT DOCUMENTS

| | | | |
|---|---|---|---|
| 7,366,392 B2 | 4/2008 | Honma et al. | |
| 10,048,536 B2 | 8/2018 | Tsai et al. | |
| 2002/0003711 A1* | 1/2002 | Hashimoto | .......... G02B 6/0028 362/615 |
| 2009/0154196 A1 | 6/2009 | Lin et al. | |
| 2011/0273907 A1* | 11/2011 | Iwasaki | ................ G02B 6/0068 362/607 |
| 2012/0250353 A1* | 10/2012 | Sakamoto | ............ G02B 6/0065 362/612 |
| 2014/0286045 A1* | 9/2014 | Pao | ........................ G02B 6/005 362/607 |

(Continued)

FOREIGN PATENT DOCUMENTS

| | | |
|---|---|---|
| CN | 110518039 A | 11/2019 |
| CN | 110649087 A | 1/2020 |

(Continued)

OTHER PUBLICATIONS

Corresponding Taiwan office action dated Oct. 25, 2021.

*Primary Examiner* — Y M. Quach Lee (74) *Attorney, Agent, or Firm* — CKC & Partners Co., LLC (57) ABSTRACT

A display device has two flat regions and a bending region located between the two flat regions. The display device includes a reflective display device, a cover structure, and a light guide plate. The cover structure is located above the reflective display device. The light guide plate is located between the reflective display device and the cover structure. The light guide plate has a microstructure, and the microstructure is located on a top surface of the light guide plate close to the cover structure. The microstructure has a plurality of second microstructures located at the bending region, and the sizes of the second microstructures vary along with the distances between the second microstructures and a center position of the light guide plate.

13 Claims, 11 Drawing Sheets

(56) References Cited

U.S. PATENT DOCUMENTS

2016/0011360 A1* 1/2016 Hasegawa ............ G02B 6/0061
362/606
2017/0229666 A1 8/2017 Tsuruoka et al.
2018/0052274 A1 2/2018 Nichol et al.

FOREIGN PATENT DOCUMENTS

CN 111430432 A 7/2020
TW 201437702 A 10/2014

* cited by examiner

DISPLAY DEVICE AND LIGHT GUIDE PLATE

CROSS-REFERENCE TO RELATED APPLICATION

This application claims priority to Taiwan Application Serial Number 109133997, filed Sep. 30, 2020, which is herein incorporated by reference in its entirety.

BACKGROUND

Field of Invention

The present invention relates to a display device and a light guide plate. More particularly, the present invention relates to a foldable display device.

Description of Related Art

Microstructure of the light guide plate of the front light module nowadays is commonly applied in non-foldable design. When the display device is folded, the microstructure may be squeezed or stretched easily. As such, the reflection angle may be changed such that light leakage may occur. In addition, the microstructure at the region with greater bending angle or smaller bending radius may be detached from the optical adhesive layer easily.

Accordingly, it is still a development direction for the industry to provide a light guide plate that may prevent the microstructure at the bending region from overstretch and prevent the debonding problem between the microstructure and the optical adhesive layer.

SUMMARY

One aspect of the present disclosure is a display device.

In some embodiments, the display device having two flat regions and a bending region located between the two flat regions. The display device includes a reflective display device, a cover structure, and a light guide plate. The cover structure is located above the reflective display device. The light guide plate is located between the reflective display device and the cover structure. The light guide plate has a microstructure, and the microstructure is located on a top surface of the light guide plate close to the cover structure. The microstructure has a plurality of second microstructures located at the bending region, and the sizes of the second microstructures vary along with the distances between the second microstructures and a center position of the light guide plate.

In some embodiments, the microstructure protrudes or recesses from the top surface.

In some embodiments, the sizes of the second microstructures reduce along with the reduction of the distances between the second microstructures and the center position of the light guide plate.

In some embodiments, the microstructure of the light guide plate has a plurality of first microstructures located at the two flat regions, and the sizes of the first microstructures are greater than or equal to the sizes of the second microstructures.

In some embodiments, the sizes of the second microstructures increase along with the reduction of the distances between the second microstructures and the center position of the light guide plate.

In some embodiments, the microstructure of the light guide plate has a plurality of first microstructures located at the two flat regions, and the sizes of the first microstructures are smaller than or equal to the sizes of the second microstructures.

In some embodiments, the density of the second microstructures increases along with the reduction of the distances between the second microstructures and the center position of the light guide plate.

In some embodiments, the density of the second microstructures reduces along with the reduction of the distances between the second microstructures and the center position of the light guide plate.

In some embodiments, the microstructure of the light guide plate has a plurality of first microstructures located at the two flat regions, and the sizes of the first microstructures are substantially the same.

In some embodiments, the display device further includes a touch sensing layer located between the light guide plate and the cover structure.

In some embodiments, the portions of the cover structure at the two flat regions are located between the portions of the light guide plate at the two flat regions when the display device is folded.

In some embodiments, the portions of the light guide plate at the two flat regions are located between the portions of the cover structure at the two flat regions when the display device is folded.

Another aspect of the present disclosure is a light guide plate.

In some embodiments, the light guide plate has two flat regions and a bending region located between the two flat regions. The light guide plate includes a plurality of microstructures located on a top surface of the light guide plate, a density distribution of the microstructures is $Y_1 = -0.0005 X_1^2 + 0.0596 X_1 - C1$, wherein $Y_1$ is the density of the microstructure, $X_1$ is the distance between the microstructures and a center position of the light guide plate, and C1 is a constant.

In some embodiments, the microstructure at a position closer to the center position of the light guide plate has a greater density and a smaller size.

Another aspect of the present disclosure is a light guide plate.

In some embodiments, the light guide plate has two flat regions and a bending region located between the two flat regions. The light guide plate includes a plurality of microstructures located on a top surface of the light guide plate, a density distribution of the microstructures is $Y_2 = 0.0004 X_2^2 - 0.4822 X_2 + C2$, wherein $Y_2$ is the density of the microstructures, $X_2$ is the distance between the microstructure and the center position of the light guide plate, and C2 is a constant.

In some embodiments, the microstructure at a position closer to the center position of the light guide plate has a smaller density and a greater size.

In the aforementioned embodiments, the contact area between the optical adhesive layer and the microstructure may be increased or maintained so as to reduce the debonding problem by adjusting the size and density of the microstructure at the bending region. When the sizes of the microstructure at the bending region are smaller, light intensity reduction can be compensated by increasing the density of the microstructure. In addition, the microstructure of the present disclosure is located on the top surface away from the reflective display panel, the possibility of peeling off between the microstructure and the optical adhesive layer can be reduced after the display device is folded, and the interference and squeeze between the microstructure and the reflective display panel can be reduced.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
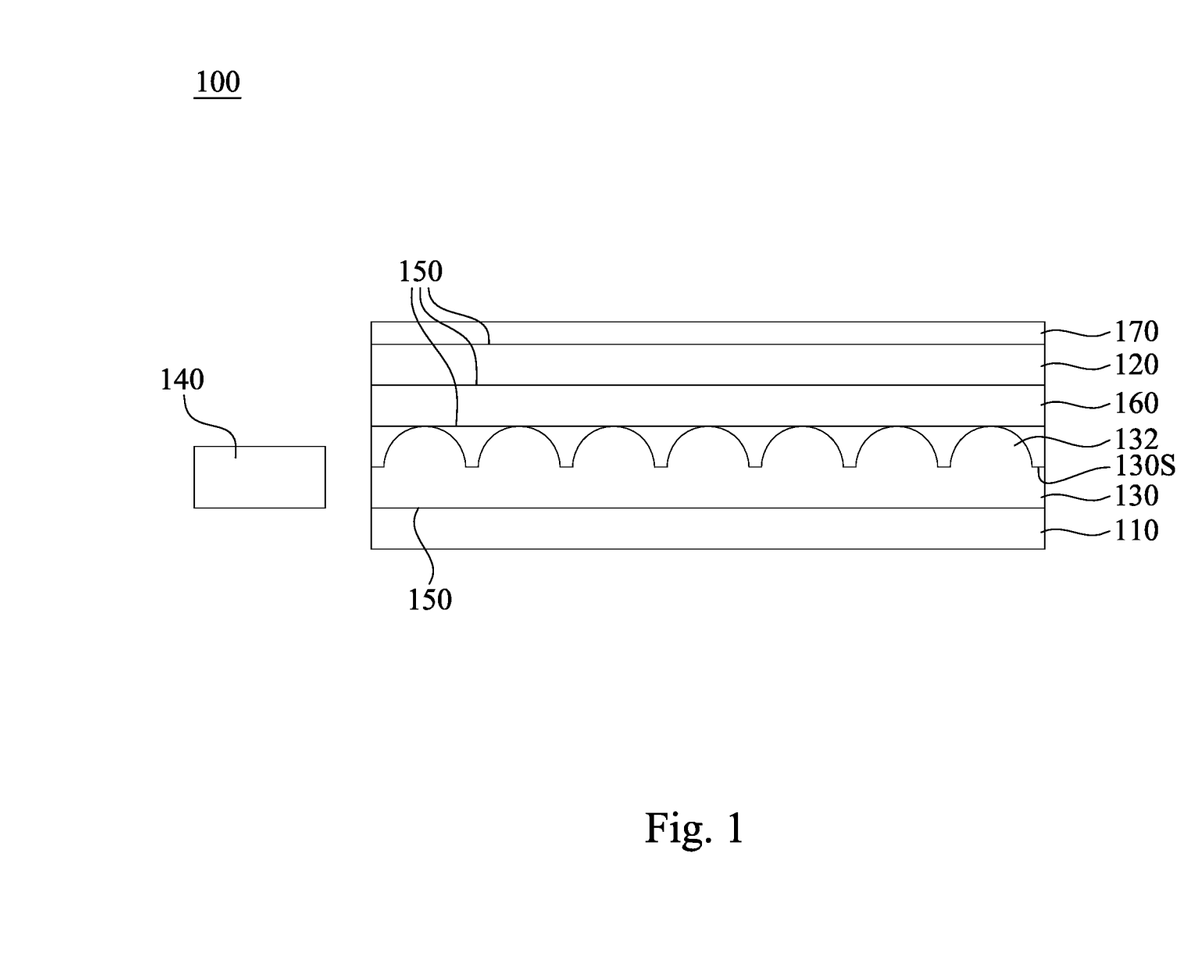
FIG. 1 is a cross-sectional view of a display device according to one embodiment of the present disclosure.

FIG. 1 is a cross-sectional view of a display device 100 according to one embodiment of the present disclosure. The display device 100 includes a reflective display panel 110, a cover structure 120, a light guide plate 130, and a light source 140. The cover structure 120 is located above the reflective display panel 110. The light guide plate 130 is located between the reflective display panel 110 and the cover structure 120. The light source 140 is located at a side of the light guide plate 130. The light guide plate 130 has a microstructure 132, and the microstructure 132 is located on a top surface 130S of the light guide plate 130 close to the cover structure 120. The microstructure 132 protrudes or recesses from the top surface 130S. In other words, the microstructure 132 is located at a side of the light guide plate 130 away from the reflective display panel 110.

The display device 100 further includes a touch sensing layer 160, an optical adhesive layer 150, and an anti-glare layer 170. The touch sensing layer 160 is located between the light guide plate 130 and the cover structure 120. In addition, the optical adhesive layer 150 is located between the touch sensing layer 160 and the light guide plate 130, between the light guide plate 130 and the reflective display panel 110, between the touch sensing layer 160 and the cover structure 120, and between the cover structure 120 and the anti-glare layer 170.

Figure 2:
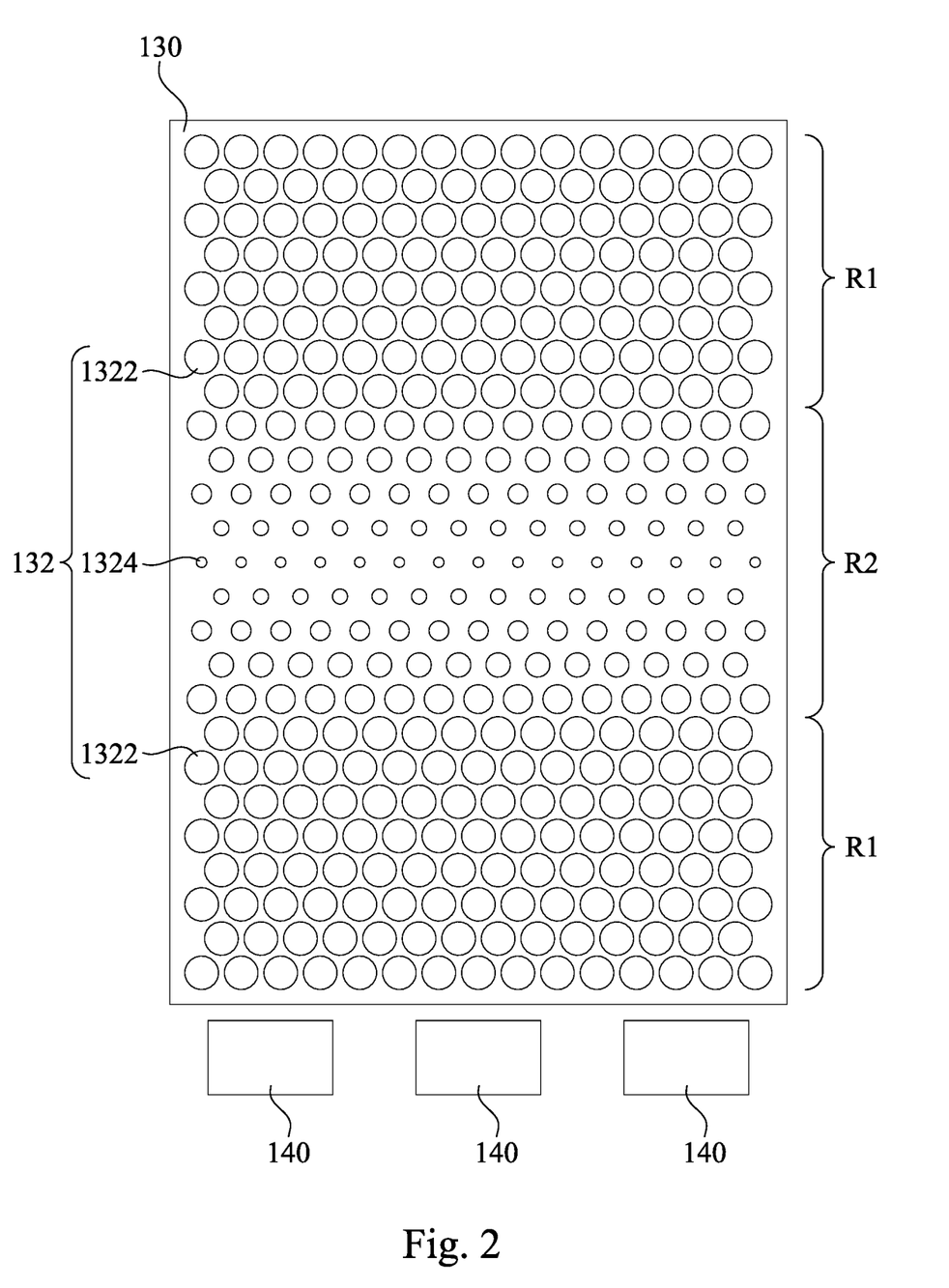
FIG. 2 is a top view of the light guide plate of the display device in FIG. 1.
Figure 3:
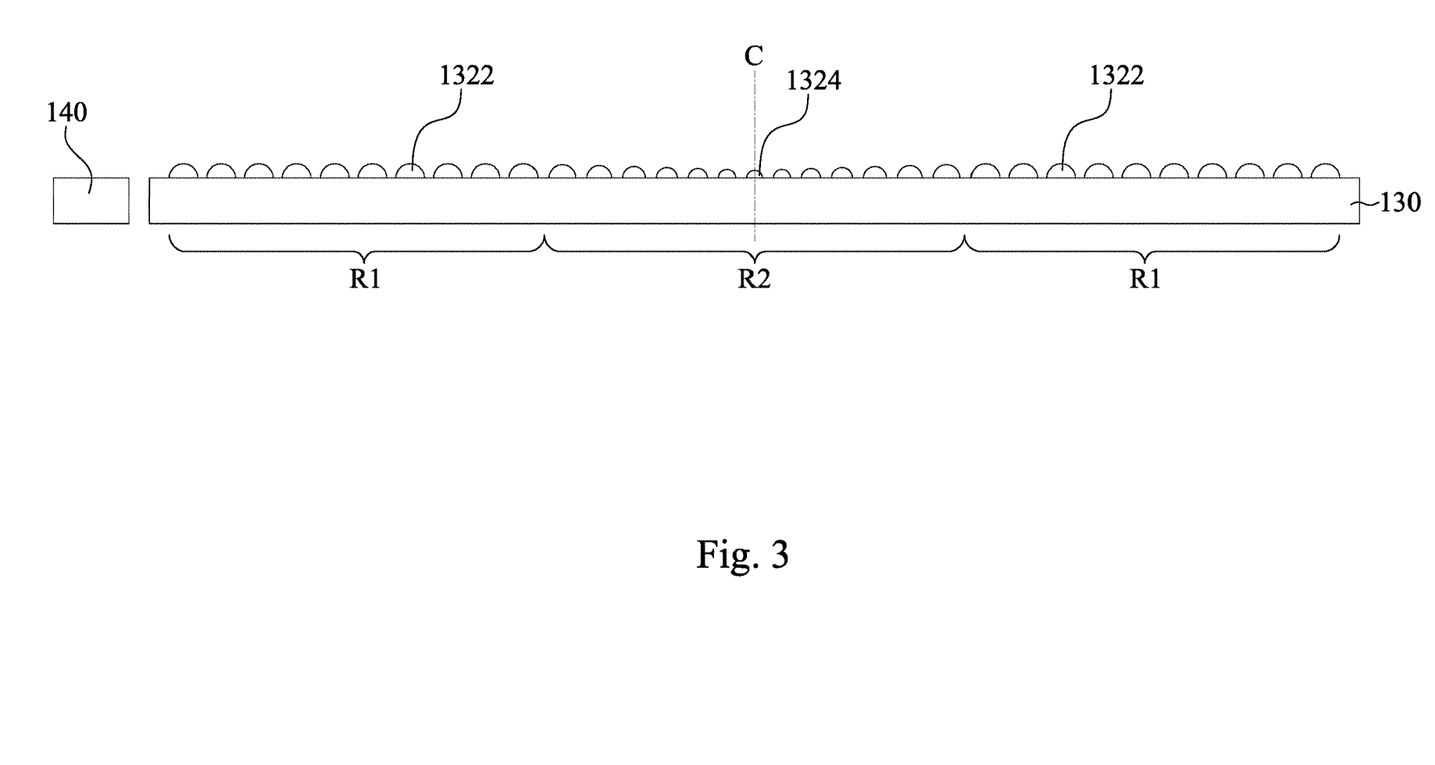
FIG. 3 is a cross-sectional view of the light guide plate of the display device in FIG. 1.

FIG. 2 is a top view of the light guide plate 130 of the display device 100 in FIG. 1. FIG. 3 is a cross-sectional view of the light guide plate 130 of the display device 100 in FIG. 1. Reference is made to FIG. 2 and FIG. 3. The display device 100 has two flat regions R1 and a bending region R2 located between the two flat regions R1. The microstructure 132 of the light guide plate 130 has a plurality of first microstructures 1322 located at the flat regions R1 and a plurality of second microstructures 1324 located at the bending region R2. The sizes of the first microstructures 1322 are substantially the same, and the sizes of the second microstructures 1324 vary along with the distances between the second microstructures 1324 and a center position C of the light guide plate 130.

In the present embodiment, the sizes of the second microstructures 1324 vary along with the distances between the second microstructures 1324 and the center position C of the light guide plate 130, and the sizes of the first microstructures 1322 are greater than or equal to the sizes of the second microstructures 1324. In other words, the second microstructure 1324 at a position closer to the center position C of the light guide plate 130 has a smaller size. In addition, the density of the second microstructures 1324 increases along with the reduction of the distances between the second microstructures 1324 and the center position C of the light guide plate 130. In the present embodiment, the microstructure 132 may have circular shape. In some other embodiments, the microstructure 132 may also have elliptical shape, tapered shape, diamond shape, or water-drop shape.

Figure 4:
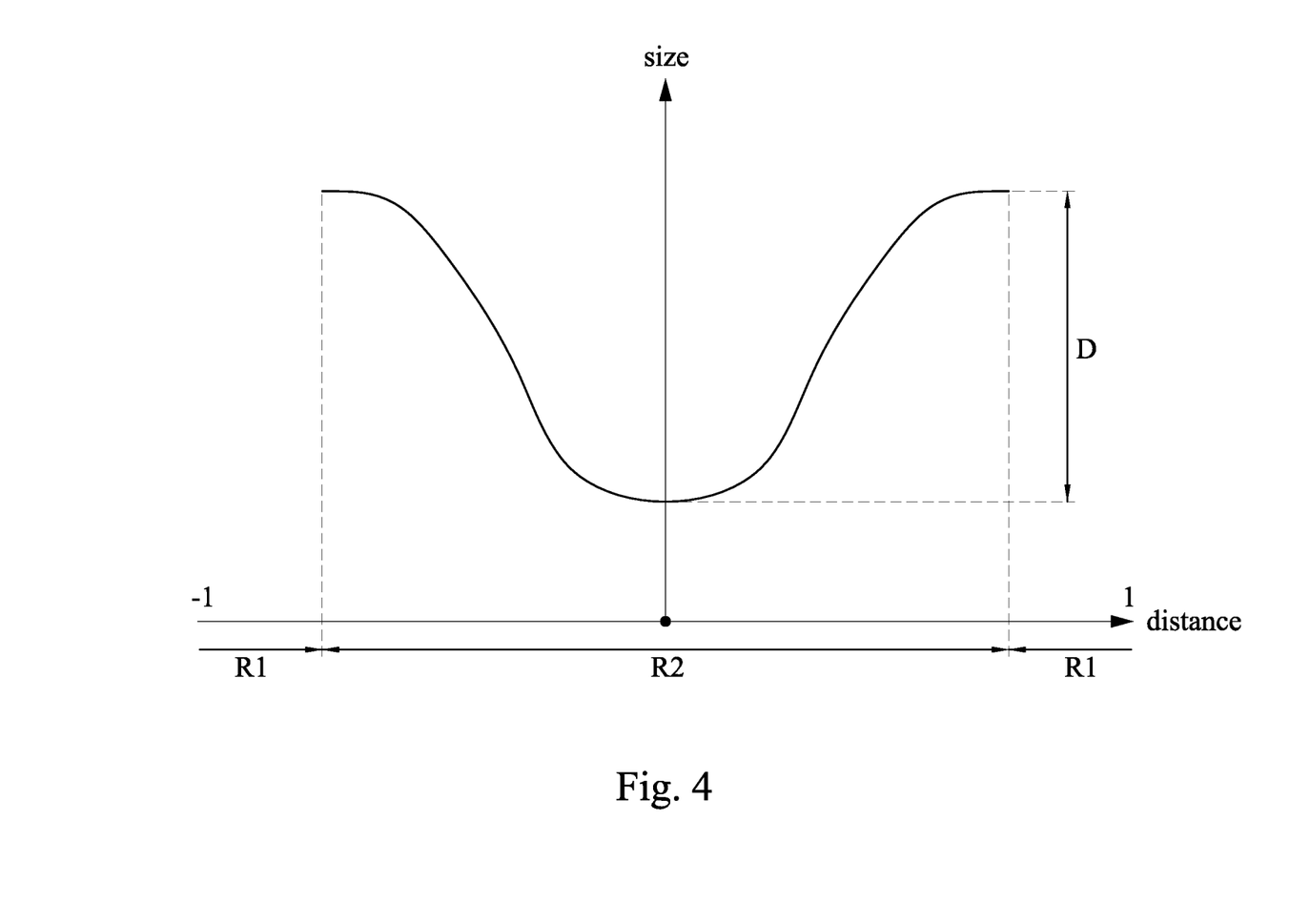
FIG. 4 is a distribution diagram of the size of the light guide plate of the display device in FIG. 1.

FIG. 4 is a distribution diagram of the size of the light guide plate 130 of the display device 100 in FIG. 1. The X axis represents the distance away from the center position C, and the Y axis represents the size of the microstructure 132. In the present embodiment, the size of the second microstructure 1324 that is most close to the center position C is smaller than the sizes of the first microstructure 1322, and a deviation D between the size of the second microstructure 1324 that is most close to the center position C and the sizes of the first microstructure 1322 is about 50% to 70%. In addition, the density of the second microstructure 1324 is about 40% to 60% higher than the density of the first microstructure 1322.

For example, in the present embodiment, the thickness of the optical adhesive layer 150 is about 25 micrometers to 50 micrometers. The thickness of the reflective display panel 110 is about 90 micrometers to 120 micrometers. The thickness of the light guide plate 130 is about 25 micrometers to 150 micrometers. The thickness of the cover structure 120 is about 50 micrometers to 75 micrometers. The thickness of the touch sensing layer 160 is about 10 micrometers to 50 micrometers. Under these conditions, the density of the microstructure 132 of the light guide plate 130 may be adjusted according to the density gain function $Y_1$. $Y_1$ is the density of the microstructure, $X_1$ is the distance between the microstructures and a center position of the light guide plate, and C1 is a constant.

$$Y_1 = -0.0005 X_1^2 + 0.0596 X_1 - C_1 \qquad \text{equation (1)}$$

Accordingly, the second microstructure 1324 at a position closer to the center position C of the light guide plate 130 has a greater density and a smaller size. As such, light intensity reduction due to the size shrink of the second microstructure 1324 at the bending region R2 of the light guide plate 130 can be compensated.

Figure 5:
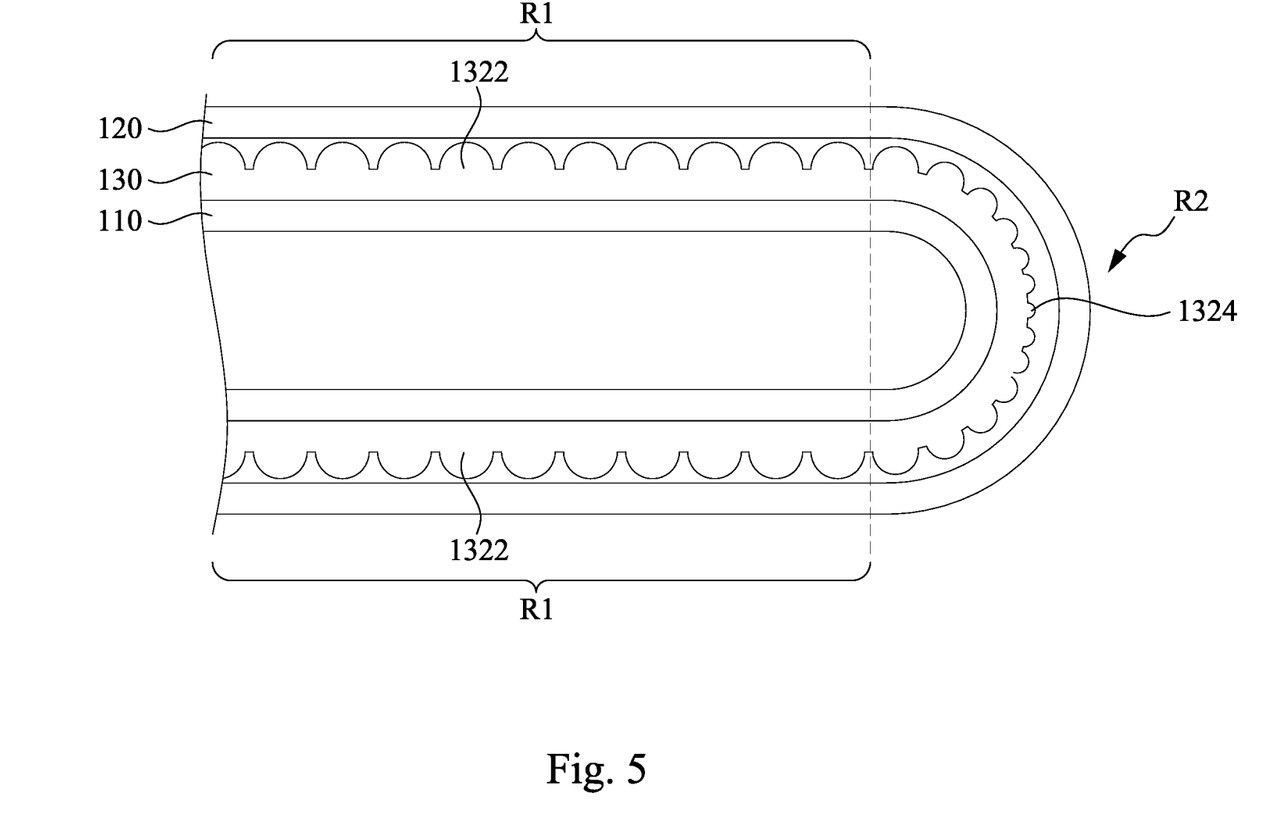
FIG. 5 is a cross-sectional view of the display device in FIG. 1, wherein the display device is folded.
Figure 6:
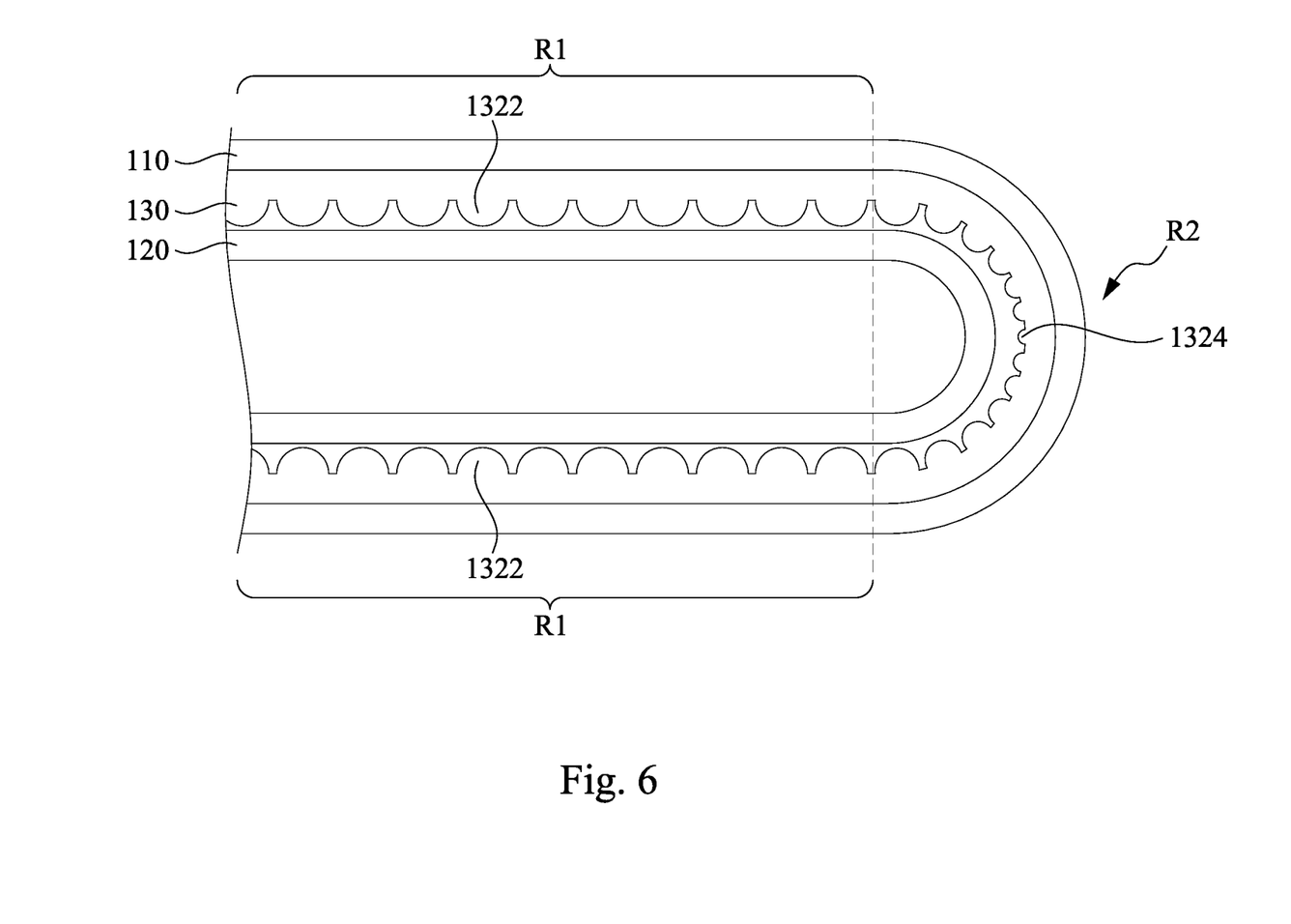
FIG. 6 is a cross-sectional view of the display device in FIG. 1, wherein the display device is folded.

FIG. 5 is a cross-sectional view of the display device 100 in FIG. 1, wherein the display device is folded. In the present embodiment, the display device 100 is folded outward. That is, the portions of the light guide plate 130 at the two flat regions R1 are located between the portions of the cover structure 120 at the two flat regions R1. FIG. 6 is a cross-sectional view of the display device 100 in FIG. 1, wherein the display device is folded. In the present embodiment, the display device 100 is folded inward. That is, the portions of the cover structure 120 at the two flat regions R1 are located between the portions of the light guide plate 130 at the two flat regions R1. Since the sizes of the second microstructure 1324 reduce along with the reduction of the distances between the second microstructure 1324 and the center position C, such design may increase the attach force between the optical adhesive layer 150 and the second microstructures 1324 when the display device 100 is folded. In addition, since the microstructure 132 is located on the top surface 130S away from the display device 100, the possibility of peeling off between the microstructure 132 and the optical adhesive layer 150 can be reduced after the display device 100 is folded, and the interference and squeeze between the microstructure 132 and the reflective display panel 110 can be reduced.

Figure 7:
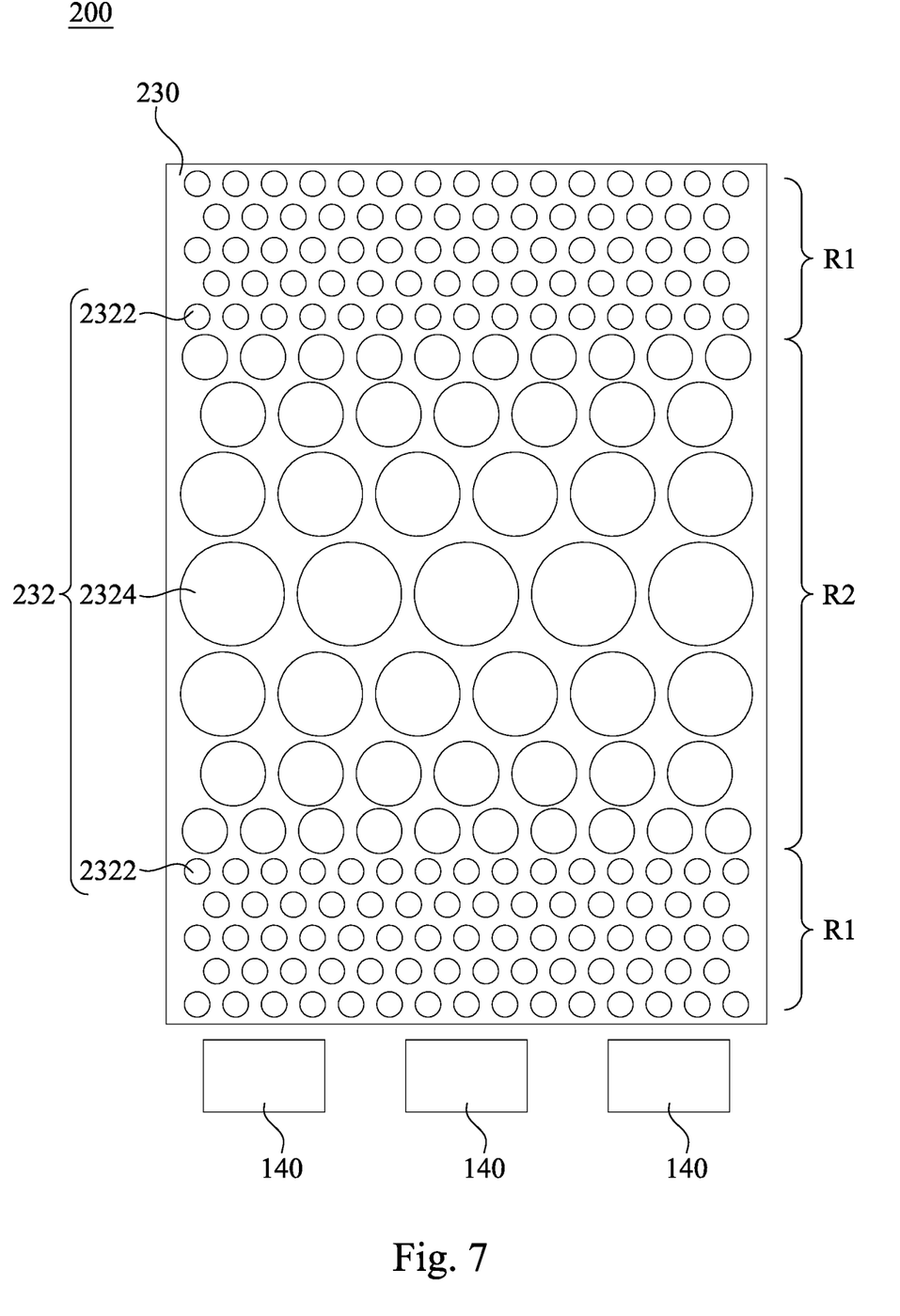
FIG. 7 is a top view of a light guide plate of a display device accordingly to another embodiment of the present disclosure.
Figure 8:
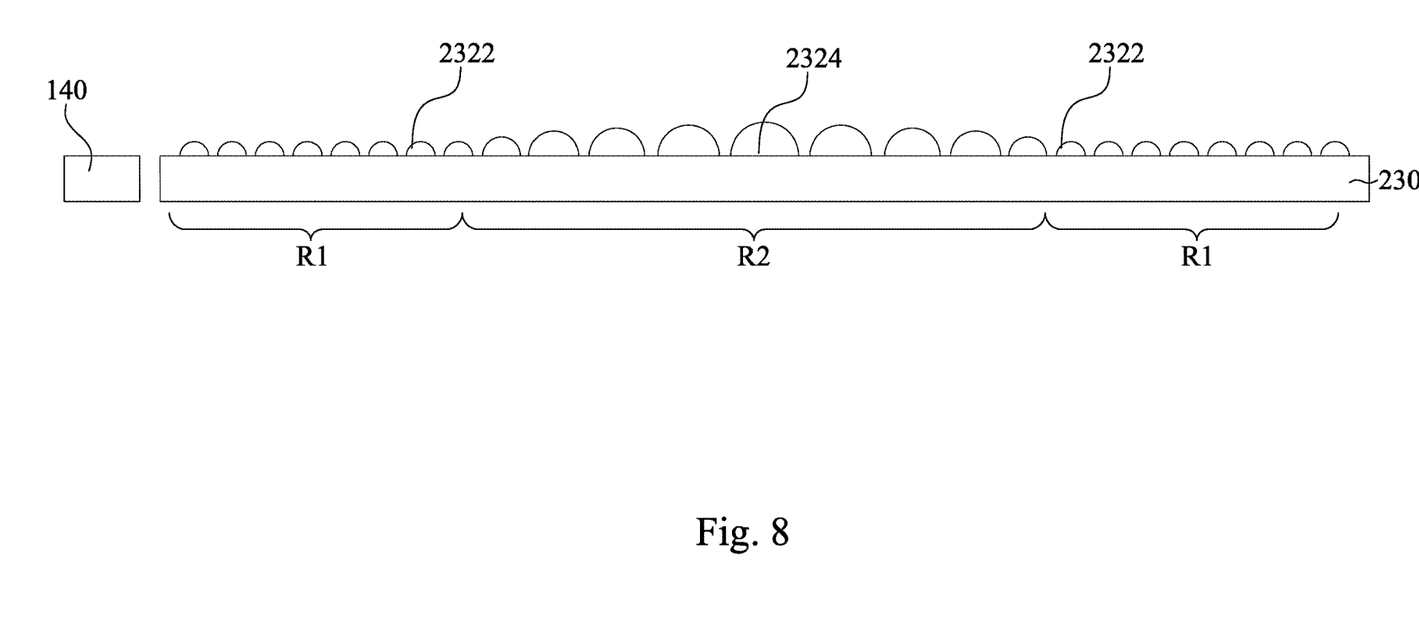
FIG. 8 is a cross-sectional view of the light guide plate of the display device in FIG. 7.

FIG. 7 is a top view of a light guide plate 230 of a display device 200 accordingly to another embodiment of the present disclosure. FIG. 8 is a cross-sectional view of the light guide plate 230 of the display device 100 in FIG. 7. The display device 200 is substantially the same as the display device 100 shown in FIG. 2, and the difference is the configuration of the light guide plate 230 of the display device 200. In the present embodiment, the sizes of the second microstructures 2324 increase along with the reduction of the distances between the second microstructures 2324 and the center position C of the light guide plate 230, and the sizes of the first microstructures 2322 are smaller than or equal to the sizes of the second microstructures 1324. In other words, the second microstructure 2324 at a position closer to the center position C of the light guide plate 230 has a greater size. In addition, the density of the second microstructures 2324 reduces along with the reduction of the distances between the second microstructures 2324 and the center position C of the light guide plate 230.

Figure 9:
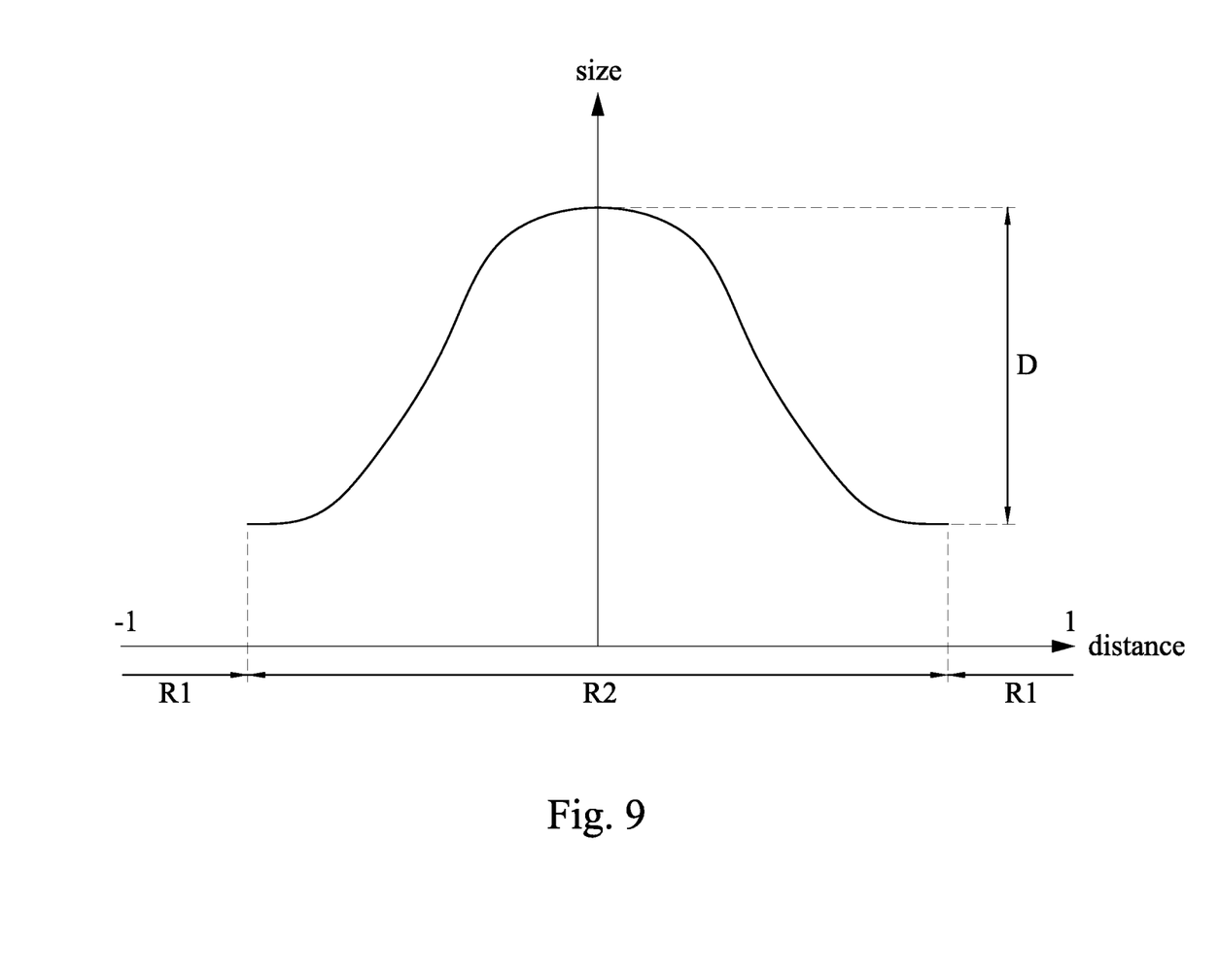
FIG. 9 is a distribution diagram of the size of the light guide plate of the display device in FIG. 7.

FIG. 9 is a distribution diagram of the size of the light guide plate 230 of the display device 200 in FIG. 7. The X axis represents the distance away from the center position C, and the Y axis represents the size of the microstructure 232. In the present embodiment, the size of the second microstructure 2324 that is most close to the center position C is greater than the sizes of the first microstructure 2322, and a deviation D between the size of the second microstructure 2324 that is most close to the center position C and the sizes of the first microstructure 2322 is about 40% to 60%. In addition, the density of the second microstructure 2324 is about 30% to 40% higher than the density of the first microstructure 2322.

For example, in the present embodiment, the density of the microstructure 232 of the light guide plate 230 may adjusted according to the density gain function $Y_2$. $Y_2$ is the density of the microstructures, $X_2$ is the distance between the microstructure and the center position of the light guide plate, and C2 is a constant.

$$Y_2 = 0.0004 X_2^2 - 0.4822 X_2 + C2 \quad \text{equation (2)}$$

Figure 10:
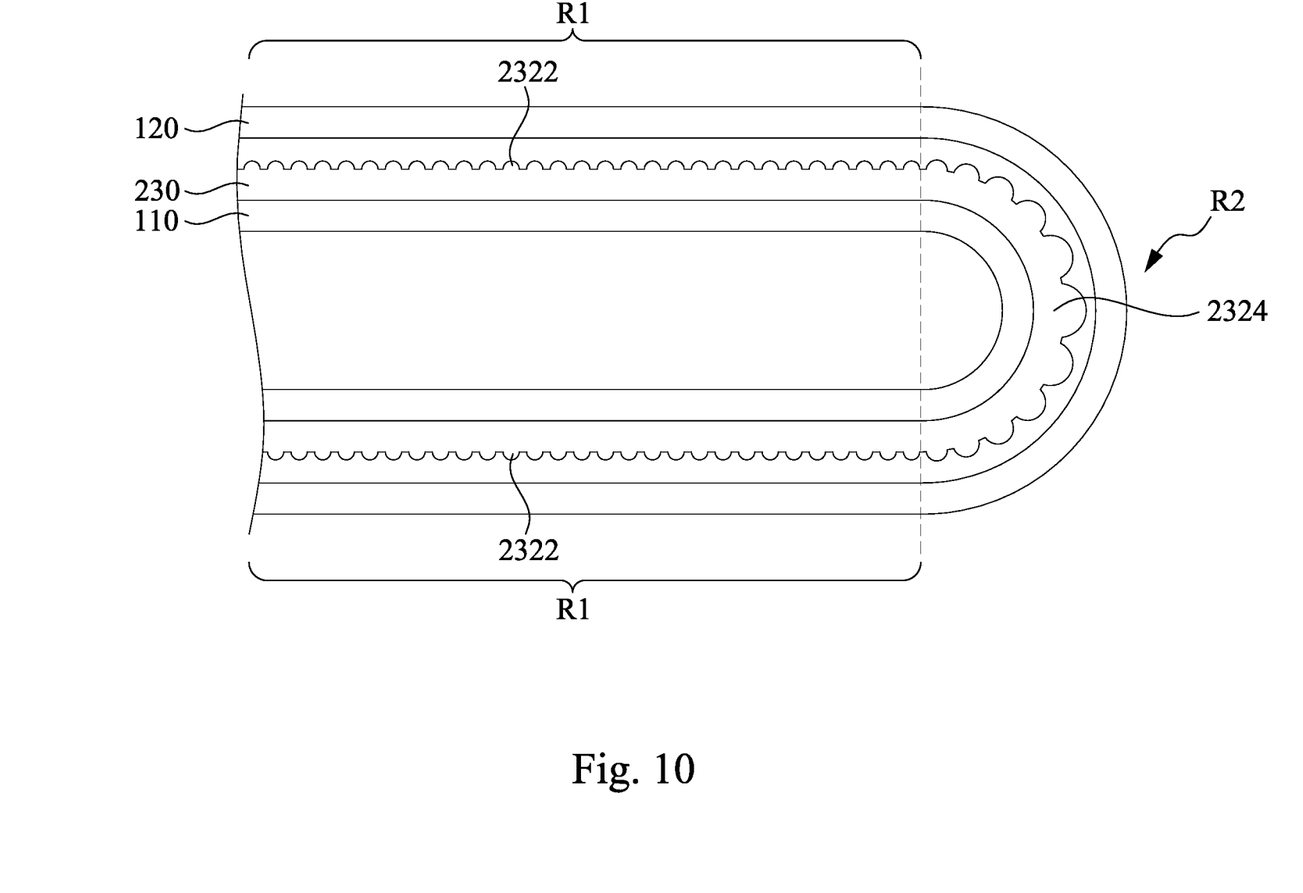
FIG. 10 is a cross-sectional view of the display device in FIG. 7, wherein the display device is folded.
Figure 11:
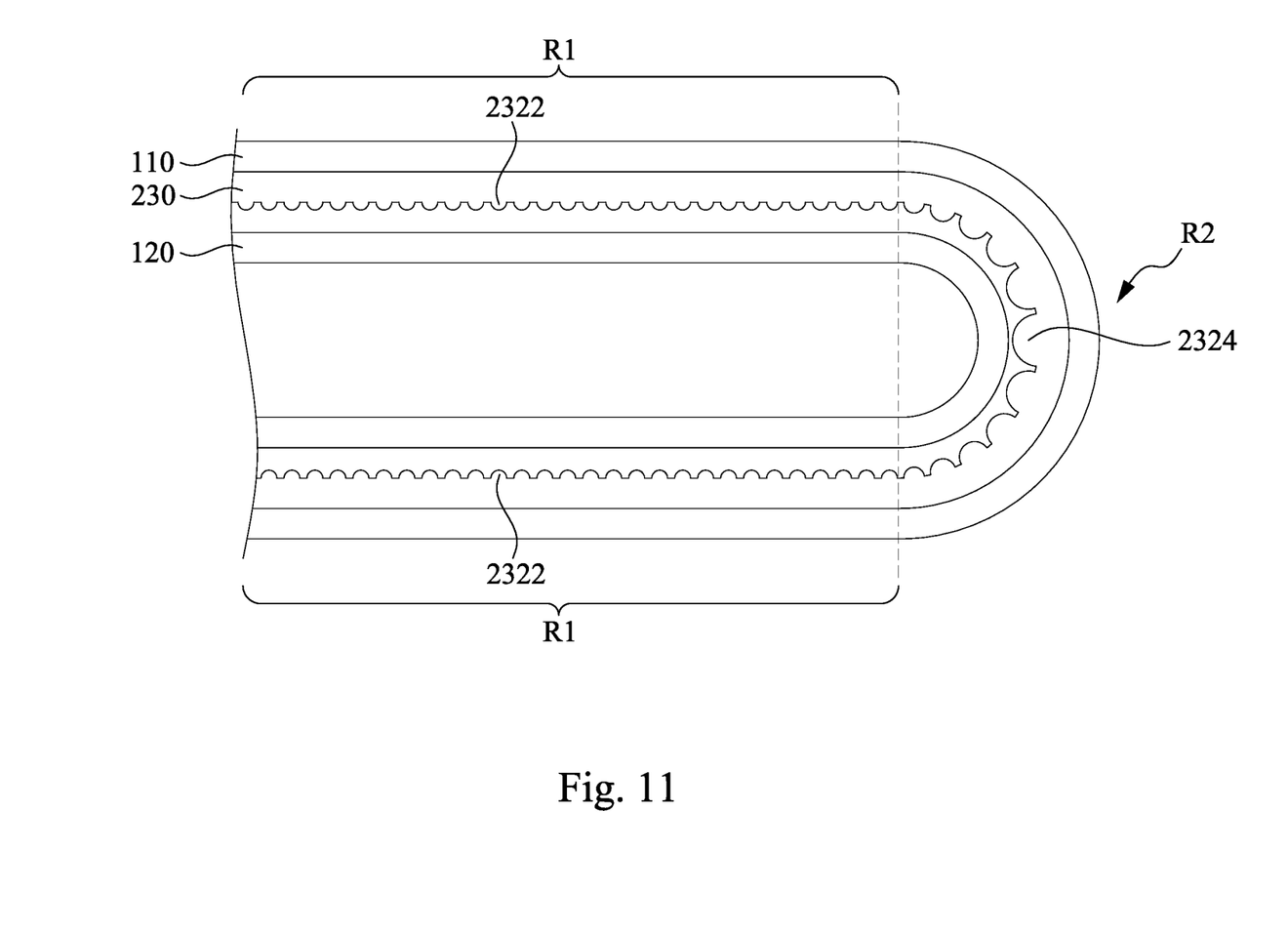
FIG. 11 is a cross-sectional view of the display device in FIG. 7, wherein the display device is folded.

FIG. 10 is a cross-sectional view of the display device 200 in FIG. 7, wherein the display device is folded. In the present embodiment, the display device 200 is folded outward. That is, the portions of the light guide plate 230 at the two flat regions R1 are located between the portions of the cover structure 120 at the two flat regions R1. FIG. 11 is a cross-sectional view of the display device 200 in FIG. 7, wherein the display device is folded. In the present embodiment, the display device 200 is folded inward. That is, the portions of the cover structure 120 at the two flat regions R1 are located between the portions of the light guide plate 230 at the two flat regions R1.

Accordingly, since the second microstructure 2324 at the position closer to the center position C of the light guide plate 230 has smaller density and greater size, overstretch of the second microstructures 2324 that is unable to recover when the display device 200 is folded may be prevented. In addition, such design may maintain the contact area between the optical adhesive layer 150 and the second microstructures 2324 so as to reduce the debonding problem. In addition, since the microstructure 232 is located on the top surface away from the reflective display panel 110, the possibility of peeling off between the microstructure 232 and the optical adhesive layer 150 can be reduced, and the interference and squeeze between the microstructure 232 and the reflective display panel 110 can be reduced.

As described above, the present disclose may increase or maintain the contact area between the optical adhesive layer and the microstructure so as to reduce the debonding problem by adjusting the size and density of the microstructure at the bending region. When the sizes of the microstructure at the bending region are smaller, light intensity reduction can be compensated by increasing the density of the microstructure. In addition, the microstructure of the present disclosure is located on the top surface away from the reflective display panel, the possibility of peeling off between the microstructure and the optical adhesive layer can be reduced after the display device is folded, and the interference and squeeze between the microstructure and the reflective display panel can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device having two flat regions and a bending region located between the two flat regions, wherein the display device comprises:
   a reflective display device;
   a cover structure located above the reflective display device; and
   a light guide plate located between the reflective display device and the cover structure, wherein the light guide plate has a microstructure, the microstructure is located on a top surface of the light guide plate close to the cover structure, the microstructure has a plurality of second microstructures located at the bending region, and the sizes of the second microstructures vary along with the distances between the second microstructures and a center position of the light guide plate, and the sizes of the second microstructures reduce along with the reduction of the distances between the second microstructures and the center position of the light guide plate.

2. The display device of claim 1, wherein the microstructure protrudes or recesses from the top surface.

3. The display device of claim 1, wherein the microstructure of the light guide plate has a plurality of first microstructures located at the two flat regions, and the sizes of the first microstructures are greater than or equal to the sizes of the second microstructures.

4. The display device of claim 1, wherein the density of the second microstructures increases along with the reduction of the distances between the second microstructures and the center position of the light guide plate.

5. The display device of claim 1, wherein the density of the second microstructures reduces along with the reduction of the distances between the second microstructures and the center position of the light guide plate.

6. The display device of claim 1, wherein the microstructure of the light guide plate has a plurality of first microstructures located at the two flat regions, and the sizes of the first microstructures are substantially the same.

7. The display device of claim 1, further comprises:
a touch sensing layer located between the light guide plate and the cover structure.

8. The display device of claim 1, wherein when the display device is folded, the portions of the cover structure at the two flat regions are located between the portions of the light guide plate at the two flat regions.

9. The display device of claim 1, wherein when the display device is folded, the portions of the light guide plate at the two flat regions are located between the portions of the cover structure at the two flat regions.

10. A light guide plate having two flat regions and a bending region located between the two flat regions, wherein the light guide plate comprises:
a plurality of microstructures located on a top surface of the light guide plate, a density distribution of the microstructures is $Y_1 = -0.0005 X_1^2 + 0.0596 X_1 - C1$, wherein $Y_1$ is the density of the microstructure, $X_1$ is the distance between the microstructures and a center position of the light guide plate, and C1 is a constant.

11. The light guide plate of claim 10, wherein the microstructure at a position closer to the center position of the light guide plate has a greater density and a smaller size.

12. A light guide plate having two flat regions and a bending region located between the two flat regions, wherein the light guide plate comprises:
a plurality of microstructures located on a top surface of the light guide plate, a density distribution of the microstructures is $Y_2 = 0.0004 X_2^2 - 0.4822 X_2 + C2$, wherein $Y_2$ is the density of the microstructures, $X_2$ is the distance between the microstructure and the center position of the light guide plate, and C2 is a constant.

13. The light guide plate of claim 12, wherein the microstructure at a position closer to the center position of the light guide plate has a smaller density and a greater size.

* * * * *